C. HORSTMANN.
INSECT TRAP.
APPLICATION FILED MAY 24, 1912.

1,042,350.

Patented Oct. 22, 1912.
2 SHEETS—SHEET 1.

WITNESSES
G. Robert Thomas

INVENTOR
Charles Horstmann
BY
ATTORNEYS

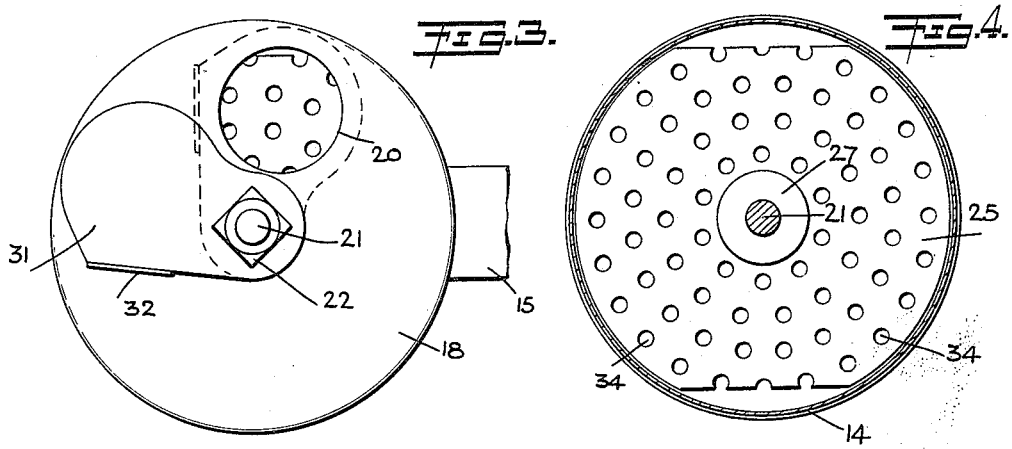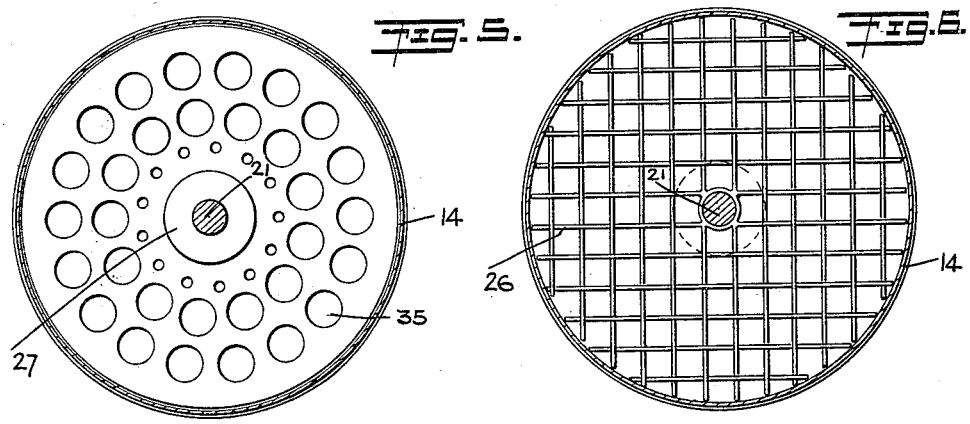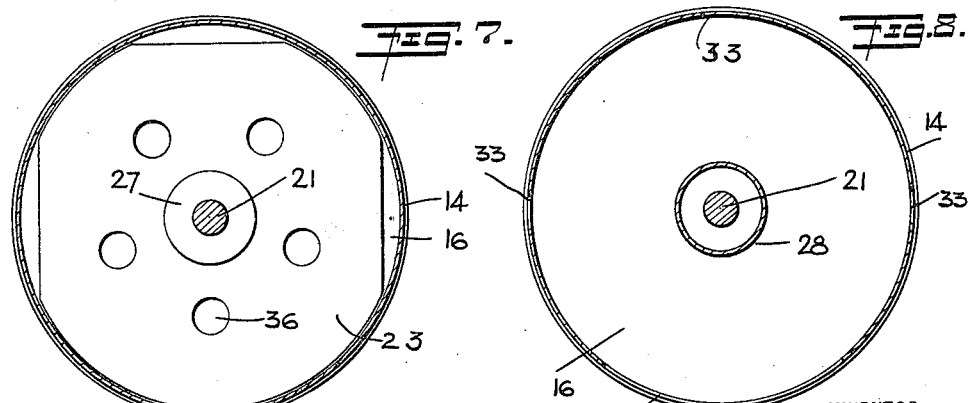

UNITED STATES PATENT OFFICE.

CHARLES HORSTMANN, OF OSWEGO, OREGON.

INSECT-TRAP.

1,042,350. Specification of Letters Patent. Patented Oct. 22, 1912.

Application filed May 24, 1912. Serial No. 699,441.

*To all whom it may concern:*

Be it known that I, CHARLES HORSTMANN, a citizen of the United States, and a resident of Oswego, in the county of Clackamas and State of Oregon, have invented a new and Improved Insect-Trap, of which the following is a full, clear, and exact description.

The principal object of the present invention is to provide a trap of the character mentioned having a maximum holding capacity, simplicity of construction, and arranged for ease of manipulation.

One embodiment of the present invention is disclosed in the structure illustrated in the accompanying drawings forming part of this specification, in which like characters of reference denote corresponding parts in all the views, and in which—

Figure 1:
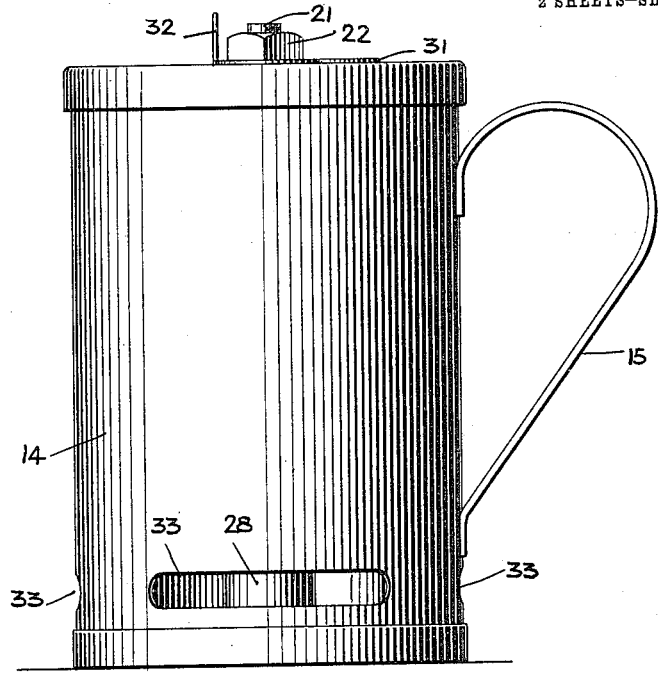
Figure 2:
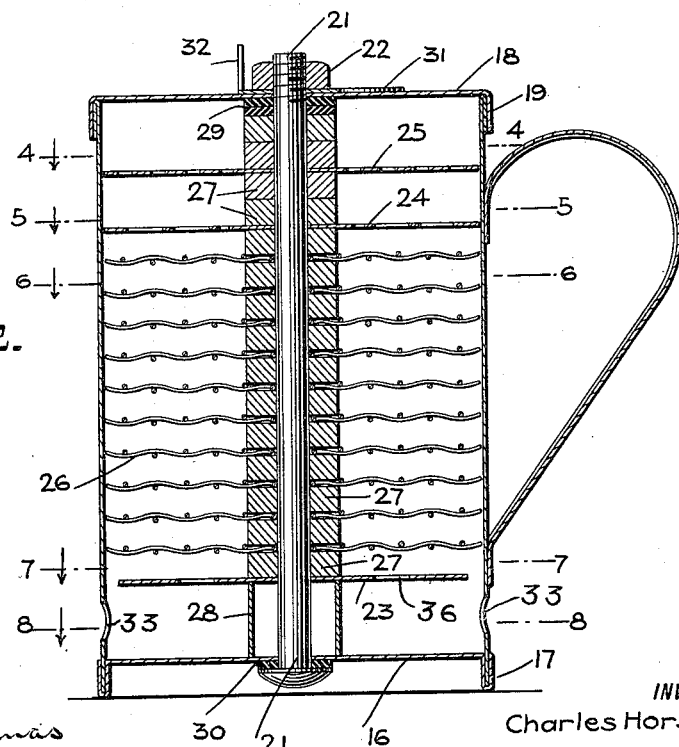

Figure 1 is a side view of a trap constructed and arranged in accordance with the present invention; Fig. 2 is a vertical section taken on the median line of the same; Fig. 3 is a top plan view of the trap, the handle being partly cut away and the filling orifice being exposed; Fig. 4 is a detail view in cross section taken on the line 4—4 in Fig. 2, showing the upper or bait receiving plate; Fig. 5 is a cross section taken on the line 5—5 in Fig. 2, showing the second or bait distributing plate; Fig. 6 is a cross section taken on the line 6—6 in Fig. 2, showing one of the climbing screens; Fig. 7 is a cross section taken on the line 7—7 in Fig. 2, showing the bottom entrance plate; and Fig. 8 is a detail view on the line 8—8 in Fig. 2, showing the bottom of the trap.

As seen in the accompanying drawings the trap primarily comprises a circular can-like body 14. The body is provided with a handle 15 whereby the same may be manipulated in the priming or baiting as hereinafter described. The can is provided with a bottom 16 having a resting flange 17, as seen best in Fig. 2 of the drawings. The can is provided with a removable top 18 having an annular guide flange 19, and provided adjacent one edge with a circular orifice 20. The top 18 and bottom 16 of the can are each provided with a centrally disposed perforation to receive the binding bolt 21. The bolt 21 is provided at the upper end with a screw threaded section to receive a clamping nut 22.

The interior structure of the trap comprises a series of sheet metal disks 23, 24 and 25 and a series of open-meshed wire disks 26. The said disks are spaced apart by washers 27, the washers and disks being each provided with a central perforation or orifice to receive the bolt 21. The arrangement of the disks may be varied; that shown in the drawings has, however, been found to be best suited to the purpose to which the trap is designed, to wit, to enable the insect the more readily to arrive at the top of the body 14 and to be thereby the more easily detained and subsequently destroyed.

When putting the structure together the following order is followed: After the bolt 21 has been threaded through the perforation in the bottom 16 and extended upward through the body 14, first in order thereafter a thimble or ring 28 is threaded over the said bolt; second, the disk 23 is threaded over the bolt 21 to rest upon the said ring 28, as seen best in Fig. 2 of the drawings; following the disk 23 is a separation washer 27; upon the first washer 27 are successively disposed the disks 26 and washers 27, one of said washers being disposed between each of said disks. The number of disks 26 employed varies according to the design of the trap, but at the top of the pile of disks and washers separating the same is placed the disk 24. Between the disk 24 and the disk 25 are placed two of the washers 27; and above the double washers 27 is then placed the last disk 25. The space between the disk 25 and the top 18 is filled by means of washers 27 and suitable yielding gaskets 29. The gaskets 29 coöperate with the gasket 30 disposed between the head of the bolt 21 and the bottom 16 to prevent the crushing of the structure when pressure is applied to the nut 22 to bind the whole together.

Prior to placing the nut 22 in position the cover plate 31 is threaded over the bolt to rest on the upper surface of the top 18. As seen best in Fig. 3 of the drawings the plate 31 is provided with an enlarged area to cover the orifice 20 in the top 18, and is also provided with an upstanding tab 32 by which the said cover plate is manipulated. By tightening or loosening the nut 22 it is obvious the cover plate 31 is locked in either closed or open position, as the case may be.

When thus constructed the operation of placing the bait in the trap is as follows: As a preliminary to the introduction of the bait the trap is thoroughly washed by pouring through the orifice 20 scalding water. This water is slushed throughout the construction to eliminate any dead or objectionable matter from the parts of the trap. When this has been thoroughly accomplished the water is poured from the body by resting the same on the side, the water passing out of the body by way of the side slots 33. When the water has been thoroughly eliminated sugar or other attractive substance is poured into the body of the trap to rest upon the upper plate 25. The orifices 34 provided in the plate 25, as seen in Fig. 4, are smaller than the orifices 35 of the next succeeding plate 24. In this manner is insured the retention of the major portion of the bait at the top of the body 14. By reason, however, of the orifices 34 a portion of the bait is permitted to pass to the plate 24 and through the orifices 35 therein to the wire disks 26 disposed thereunder. The mesh of the wire disks being large it will be understood that but a small proportion of the bait will lodge thereon. That part of the bait which does pass through the orifices 35 in the plate 24 and through the meshes of the disks 26 is arrested on the lower plate 23, a small proportion passing through the orifices 36 in the plate 23 to the floor or upper surface of the bottom 16 of the trap. It will be noticed throughout the above that the object is to form a path or lead up to the body 14 where it is designed to trap the major portion of the insects to be destroyed.

The destruction of the insects is preferably conducted by immersing the trap in water, hot or cold. In any event, however, on re-baiting the trap it is desired that the same shall be rendered sanitary by scalding or sterilizing the interior to remove the detritus. It will be understood that the trap, after being baited, is placed in any suitable position to attract the insects for the capture of which the trap is designed.

It will be understood that the insects are captured by being drawn by the bait in the trap, to enter through the slots 33. From the disk 16, they crawl upward through the successive wire disks 26. It is presumed that somewhere in the course of their upward climb, prior to reaching the disk 25, where the main portion of the bait is deposited, the insects are overcome and die.

Having thus described my invention, what I claim as new and desire to secure by Letters Patent is:—

1. An insect trap comprising a box-like body portion having a closed top and bottom with side entrance passages; a plurality of perforated disks; a plurality of spacing devices disposed between said disks; a binding bolt passed through said disks and said spacing devices; and a clamping device to fit said bolt to clamp said disks and spacing devices thereupon.

2. An insect trap comprising a box-like body portion having a closed top provided with a supply orifice, a bottom, and side entrance openings; a plurality of perforated disks; a plurality of spacing members interposed between said disks; a binding bolt passing through said disks, spacing members and the bottom and top of said body portion; a cover plate for the supply orifice in said top; and screw threaded clamping means for holding said plates in fixed position.

In testimony whereof I have signed my name to this specification in the presence of two subscribing witnesses.

CHARLES HORSTMANN.

Witnesses:
E. L. MOULTON,
GEO. C. BROWNELL.

Copies of this patent may be obtained for five cents each, by addressing the "Commissioner of Patents, Washington, D. C."